US011558271B2

(12) United States Patent
Mota et al.

(10) Patent No.: US 11,558,271 B2
(45) Date of Patent: Jan. 17, 2023

(54) SYSTEM AND METHOD OF COMPARING TIME PERIODS BEFORE AND AFTER A NETWORK TEMPORAL EVENT

(71) Applicant: Cisco Technology, Inc., San Jose, CA (US)

(72) Inventors: Javier Cruz Mota, Lussy-sur-Morges (CH); Erwan Barry Tarik Zerhouni, Zurich (CH); Abhishek Kumar, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/560,748

(22) Filed: Sep. 4, 2019

(65) Prior Publication Data

US 2021/0067430 A1 Mar. 4, 2021

(51) Int. Cl.
*H04L 43/067* (2022.01)
*H04L 43/045* (2022.01)
*H04L 43/16* (2022.01)
*H04L 41/0631* (2022.01)

(52) U.S. Cl.
CPC .......... *H04L 43/067* (2013.01); *H04L 43/045* (2013.01); *H04L 43/16* (2013.01)

(58) Field of Classification Search
CPC ...... H04L 43/067; H04L 43/16; H04L 43/045
See application file for complete search history.

(56) References Cited

U.S. PATENT DOCUMENTS

| | | | | |
|---|---|---|---|---|
| 6,327,677 B1* | 12/2001 | Garg | ...................... | H04L 41/06 709/224 |
| 6,571,285 B1* | 5/2003 | Groath | ................ | H04L 41/0631 370/352 |
| 7,343,453 B2* | 3/2008 | Prahlad | ................. | G06F 3/0482 711/117 |
| 7,529,782 B2* | 5/2009 | Prahlad | ............... | G06F 11/1435 |
| 8,347,148 B1* | 1/2013 | Harrison | ............. | G06F 11/3409 714/47.2 |
| 8,375,255 B2* | 2/2013 | Wang | .................... | G06F 11/006 714/26 |
| 8,407,176 B2* | 3/2013 | Boettcher | ............. | H04L 41/142 706/47 |
| 8,832,268 B1* | 9/2014 | Chheda | ............... | H04L 43/0817 705/7.22 |
| 9,128,995 B1* | 9/2015 | Fletcher | .............. | G06F 16/9535 |
| 9,210,056 B1* | 12/2015 | Choudhary | ....... | G06F 16/24565 |
| 9,294,361 B1* | 3/2016 | Choudhary | ........... | G06F 3/0482 |
| 9,391,866 B1* | 7/2016 | Martin | ................ | H04L 41/0681 |
| 9,432,865 B1* | 8/2016 | Jadunandan | .......... | H04W 24/08 |
| 9,439,081 B1* | 9/2016 | Knebl | ................... | H04W 16/18 |
| 9,608,887 B2* | 3/2017 | Vaswani | ............. | H04L 43/0817 |

(Continued)

*Primary Examiner* — Alina A Boutah
(74) *Attorney, Agent, or Firm* — Polsinelli (57) ABSTRACT

The present technology pertains to a system, method, and non-transitory computer-readable medium for evaluating the impact of network changes. The technology can detect a temporal event, wherein the temporal event is associated with a change in a network configuration, implementation, or utilization. The technology defines, based on a nature of the temporal event, a first period prior to the temporal event or a second period posterior to the temporal event. The technology compares network data collected in the first period and network data collected in the second period.

20 Claims, 4 Drawing Sheets

(56) References Cited

U.S. PATENT DOCUMENTS

| | | | |
|---|---|---|---|
| 9,961,571 B2* | 5/2018 | Yang | H04W 24/04 |
| 10,181,982 B2* | 1/2019 | Tapia | H04L 41/5009 |
| 10,200,262 B1* | 2/2019 | Leverich | H04L 43/0823 |
| 10,200,901 B2* | 2/2019 | Chen | H04W 24/04 |
| 10,313,225 B1* | 6/2019 | Shevade | H04L 45/44 |
| 10,355,913 B2* | 7/2019 | Dang | H04L 41/065 |
| 10,375,098 B2* | 8/2019 | Oliner | G06N 3/04 |
| 10,552,390 B2* | 2/2020 | Anand | G05B 11/3409 |
| 10,623,285 B1* | 4/2020 | Shevade | H04L 43/0817 |
| 10,666,525 B2* | 5/2020 | Tapia | H04L 43/065 |
| 2002/0082886 A1* | 6/2002 | Manganaris | H04L 41/16 |
| | | | 719/318 |
| 2004/0153844 A1* | 8/2004 | Ghose | G06F 11/0727 |
| | | | 714/42 |
| 2004/0199791 A1* | 10/2004 | Poletto | H04L 43/00 |
| | | | 726/23 |
| 2007/0188494 A1* | 8/2007 | Agutter | G06F 16/248 |
| | | | 345/440 |
| 2008/0052394 A1* | 2/2008 | Bugenhagen | H04L 45/22 |
| | | | 709/224 |
| 2009/0164623 A1* | 6/2009 | Dey | G06Q 10/06 |
| | | | 709/224 |
| 2009/0240644 A1* | 9/2009 | Boettcher | H04L 41/069 |
| | | | 706/47 |
| 2012/0069747 A1* | 3/2012 | Wang | H04L 41/082 |
| | | | 370/252 |
| 2012/0131185 A1* | 5/2012 | Petersen | G06F 16/24575 |
| | | | 709/224 |
| 2013/0182700 A1* | 7/2013 | Figura | H04L 43/04 |
| | | | 370/352 |
| 2013/0219043 A1* | 8/2013 | Steiner | G06F 9/4856 |
| | | | 709/224 |
| 2014/0043983 A1* | 2/2014 | Huang | H04L 41/0677 |
| | | | 370/244 |
| 2014/0269382 A1* | 9/2014 | Ryan | H04W 24/04 |
| | | | 370/252 |
| 2014/0280886 A1* | 9/2014 | Burns | H04L 43/04 |
| | | | 709/224 |
| 2014/0336984 A1* | 11/2014 | Starr | G05B 23/0235 |
| | | | 702/183 |
| 2015/0058474 A1* | 2/2015 | Bloom | H04L 47/2425 |
| | | | 709/224 |
| 2015/0078344 A1* | 3/2015 | Futaki | H04W 36/0083 |
| | | | 370/332 |
| 2015/0127804 A1* | 5/2015 | Kripalani | G06F 11/302 |
| | | | 709/224 |
| 2015/0127995 A1* | 5/2015 | Kripalani | G06F 11/321 |
| | | | 714/47.1 |
| 2015/0138988 A1* | 5/2015 | Shaw | H04W 72/0453 |
| | | | 370/241 |
| 2015/0324815 A1* | 11/2015 | Pettinati | G06Q 30/02 |
| | | | 705/7.31 |
| 2015/0341212 A1* | 11/2015 | Hsiao | G06F 3/0482 |
| | | | 715/735 |
| 2015/0347953 A1* | 12/2015 | Saito | G06Q 10/06393 |
| | | | 705/7.39 |
| 2016/0103888 A1* | 4/2016 | Fletcher | G06F 16/2455 |
| | | | 707/722 |
| 2016/0104076 A1* | 4/2016 | Maheshwari | G06N 20/00 |
| | | | 706/12 |
| 2016/0104090 A1* | 4/2016 | Alekseyev | G06Q 10/06393 |
| | | | 705/7.39 |
| 2016/0105325 A1* | 4/2016 | Fletcher | H04L 43/045 |
| | | | 715/737 |
| 2016/0105338 A1* | 4/2016 | Fletcher | G06F 16/90335 |
| | | | 709/224 |
| 2016/0217022 A1* | 7/2016 | Velipasaoglu | G06F 11/0772 |
| 2016/0381580 A1* | 12/2016 | Kwan | H04L 41/5009 |
| | | | 370/252 |
| 2017/0046127 A1* | 2/2017 | Fletcher | H04L 41/069 |
| 2017/0155570 A1* | 6/2017 | Maheshwari | H04L 43/50 |
| 2017/0163669 A1* | 6/2017 | Brown | G06N 5/04 |
| 2017/0201897 A1* | 7/2017 | Yang | H04W 24/04 |
| 2017/0220938 A1* | 8/2017 | Sainani | G06F 16/2471 |
| 2017/0309094 A1* | 10/2017 | Farahat | G07C 5/0841 |
| 2017/0310546 A1* | 10/2017 | Nair | H04L 41/0654 |
| 2017/0364819 A1* | 12/2017 | Yang | H04L 41/0636 |
| 2018/0027088 A1* | 1/2018 | Zou | H04L 43/08 |
| | | | 709/224 |
| 2018/0123864 A1* | 5/2018 | Tucker | H04L 41/065 |
| 2018/0196837 A1* | 7/2018 | Anand | G06F 11/3409 |
| 2018/0218269 A1* | 8/2018 | Oliner | G06N 20/00 |
| 2018/0220314 A1* | 8/2018 | Chen | H04W 24/04 |
| 2018/0287898 A1* | 10/2018 | Bellini, III | H04L 41/5074 |
| 2019/0058643 A1* | 2/2019 | Knowles | G06F 11/301 |
| 2019/0068443 A1* | 2/2019 | Li | H04L 41/0816 |
| 2019/0098043 A1* | 3/2019 | Banerjee | H04L 63/1425 |
| 2019/0156359 A1* | 5/2019 | Sinha | G06Q 30/0204 |
| 2019/0245734 A1* | 8/2019 | Wu | H04L 41/16 |
| 2019/0306023 A1* | 10/2019 | Vasseur | G06N 5/04 |
| 2019/0356565 A1* | 11/2019 | Zeng | H04L 41/0816 |
| 2019/0362249 A1* | 11/2019 | Rogynskyy | G06F 16/2228 |
| 2020/0019911 A1* | 1/2020 | Powers | G06F 16/24578 |
| 2020/0028782 A1* | 1/2020 | Li | H04L 47/12 |
| 2020/0029240 A1* | 1/2020 | Li | H04W 28/0289 |
| 2020/0044927 A1* | 2/2020 | Apostolopoulos | |
| | | | H04L 67/2804 |
| 2020/0092172 A1* | 3/2020 | Kumaran | H04B 17/345 |
| 2020/0296006 A1* | 9/2020 | Gonguet | H04L 41/5009 |

\* cited by examiner

SYSTEM AND METHOD OF COMPARING TIME PERIODS BEFORE AND AFTER A NETWORK TEMPORAL EVENT

TECHNICAL FIELD

The present technology pertains to a method used to evaluate changes in a network with respect to key performance indicators, and more specifically defining periods of time before and after changes in a network and evaluating changes in the key performance indicators between the two periods of time.

BACKGROUND

With the ubiquity of the Internet, the performance of computer networks has become a more pressing concern for businesses, governments, and other organizations. Network owners and administrators are constantly looking for ways to improve the performance of their networks by optimizing for a variety of key performance indicators. However, constantly monitoring a network for changes in the network can be time-consuming, costly, and labor intensive. Furthermore, evaluating changes does not always take into account interaction effects between different key performance indicators.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

The present technology pertains to evaluating changes in a network with respect to key performance indicators. The present technology can detect a temporal event, wherein the temporal event is associated with a change in the configuration or utilization of the network. The present technology can further automatically define a first period prior to the temporal event and a second period posterior to the temporal event. Data from the first period and second period can be collected and compared, evaluating the effect of the network change with respect to the key performance indicators.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for detection and evaluation of network changes. The plethora of types of network changes, from replacing hardware, to altering topologies, to implementing new traffic control mechanisms, make logging and evaluating all possible network changes a distinct challenge. Moreover, the importance of reliable, efficient computer networks has only increased with society's increasing reliance on computer technology, and will most likely increase in the future. Automatically detecting and evaluating network changes implemented to meet this growing demand constitutes a need in the art.

Figure 1:
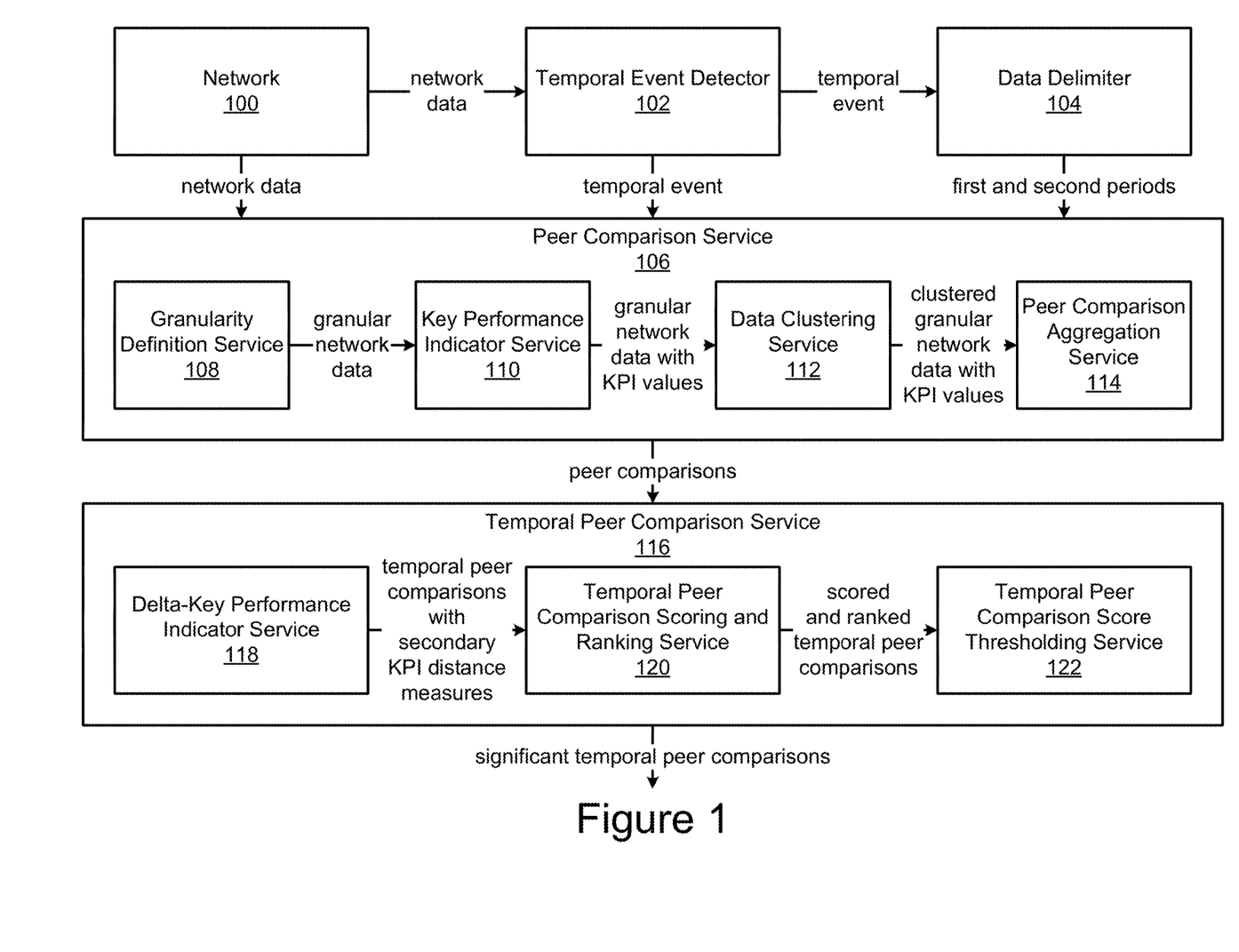
FIG. 1 illustrates an example configuration of devices and a network in accordance with some aspects of the present technology.

FIG. 1 illustrates an exemplary configuration of devices and a network in accordance with some aspects of the present technology. From network data, a temporal event is detected and first and second periods around the temporal event are defined. The network data is gathered and analyzed to determine how distributions of key performance indicators changed from before the temporal event to after it. Changes above a certain magnitude are classified as significant, and are passed on to a network administrator or other service.

Network 100 is any computer network which is monitored by Temporal Event Detector 102 for network changes. Temporal Event Detector 102 is a service which detects temporal events. A temporal event is a change point in a network, wherein the network is altered in some way such that performance might be affected. In some embodiments, a temporal event can include upgrading a network application, altering the network topology, or replacing a piece of hardware on the network.

Temporal events can be automatically detected by a learning algorithm on Temporal Event Detector 102, detected from a list of possible temporal events defined by a network administrator, or even manually entered by a network administrator. Temporal events can be detected and defined retrospectively. For example, suppose a router in Network 100 breaks. After sufficient data has been gathered, Temporal Event Detector 102 can declare a temporal event retrospectively at the time when a meaningful change in network performance occurred, i.e. approximately at the time when the router broke.

Data Delimiter 104 is a service which defines first and second periods around the temporal event. The first period occurs before the temporal event, and the second period occurs after the temporal event. The first period and second period can be of the same duration or of different durations. In some embodiments, the first and second periods can be automatically derived by a learning algorithm or manually defined by a network administrator.

Accurately determining the impact of a temporal event requires an appropriate quantity and quality of data. The duration of the first and second periods reflect these considerations to best evaluate the temporal event's effect on Network 100. The duration of the first and second periods can be determined by factors such as the nature of the temporal event, the rate of data acquisition, or the desired confidence in any change. In some embodiments, these factors can be learned from previous temporal event evaluations, or can be defined by a network administrator.

Peer Comparison Service 106 receives network data, the temporal event, and the first and second periods and transforms them into peer comparisons. Granularity Definition Service 108 defines a granularity level for a peer comparison. Key Performance Indicator Service 110 measures key performance indicator data for the received network data. Data Clustering Service 112 clusters the received network data by at least one primary key performance indicator. Peer Comparison Aggregation Service 114 aggregates the available data into peer comparisons.

An individual peer comparison consists of a granularity level, more than one key performance indicator, and clustering of entity data by at least one primary key performance indicator. An entity is defined as a data-generating part of Network 100. A granularity level defines which aspects of the network will be examined in the peer comparison. Within primary key performance indicator clusters, subsequent clustering by secondary key performance indicators allows for a network administrator or other service to examine distributions of secondary key performance indicators within the primary key performance indicator clusters.

In some embodiments, a granularity level can consist of radios, access points, or floors of the network. An individual radio, access point, or floor of a building which is covered by a network constitutes an entity of the network. In some embodiments, Granularity Definition Service 108 can implement a granularity level determined by a network administrator, select a granularity level from a pre-defined list, or dynamically choose a granularity level from the network data by some learning algorithm.

A key performance indicator is a measure of network data which is a quantifiable measure of network efficacy. Key Performance Indicator Service 110 generates key performance indicator data from network data at the granularity level. These key performance indicators can be determined by a network administrator, selected from a pre-defined list of key performance indicators, or dynamically generated from the network data by Key Performance Indicator Service 110. Key performance indicators can include average throughput, maximum number of clients connected, or average client received signal strength.

Data Clustering Service 112 clusters entity data from the first and second periods by at least one primary key performance indicator. The data can be clustered using k-means, DBScan, self-organizing maps, or other algorithms. Entity data is clustered without considering the time period from which the entity data comes. For instance, suppose the first period covered the month of July, the second period covered the month of August, the granularity level was defined as network access points, the key performance indicator was average client received signal strength, and the clustering algorithm was k-means. Data Clustering Service 112 clusters all data from July and August together on average client received signal strength, ignoring the time period from which the data came. This creates clusters which can have a mixture of first period and second period data.

Peer Comparison Aggregation Service 114 compiles data generated by Network 100, Temporal Event Detector 102, Data Delimiter 104, Granularity Definition Service 108, Key Performance Indicator Service 110, and Data Clustering Service 112. In some embodiments, it can create one or more peer comparisons for evaluation. It can wait until the end of the second period to create a peer comparison if the end of the second period will occur after the temporal event has been defined by Temporal Event Detector 102.

Temporal Peer Comparison Service 116 receives all peer comparisons, transforms them into temporal peer comparisons, scores and ranks the temporal peer comparisons, and determines whether individual temporal peer comparisons show sufficient changes to necessitate further examination. It determines which temporal peer comparisons are shown to a user or passed on to another service.

A temporal peer comparison is an extension of a peer comparison. A temporal peer comparison adds to a peer comparison the dimension of time. It separates the secondary key performance indicator clusters within primary key performance indicator clusters into first period and second period entity data. A network administrator or service can then evaluate changes in the distribution of secondary key performance indicators within these temporally-constrained primary key performance indicator clusters. Evaluation of these changes allows for an evaluation of the effect of the temporal event.

Delta-Key Performance Indicator Service 118 performs calculations on at least one secondary key performance indicator for each primary key performance indicator cluster in each peer comparison. Within each primary key performance indicator cluster, entity data is clustered by the secondary key performance indicator. Once clustered on the secondary key performance indicator, the entity data is divided into first period data and second period data. At this point, the temporal peer comparison has been created. Distances can be computed between the distributions of first period entity data and second period entity data within each primary key performance indicator cluster. Delta-Key Performance Indicator Service 118 can use the Kolmogorov-Smirnov distance, earth mover's distance, or another measure to calculate these distances.

Based on the computed distances, Temporal Peer Comparison Scoring and Ranking Service 120 scores all temporal peer comparison and ranks them by their assigned scores. In some embodiments, the scoring function can average the distances between secondary key performance indicator distributions for each primary key performance indicator cluster in a temporal peer comparison, or it can be a more complicated function of distance.

Temporal Peer Comparison Score Thresholding Service 122 classifies the scored and ranked temporal peer comparisons as significant or insignificant based on their scores from Temporal Peer Comparison Scoring and Ranking Service 120. It can use a pre-defined threshold, or can dynamically classify each set of incoming temporal peer comparisons. It can set thresholds based on factors like primary key performance indicator, nature of the temporal event, or duration of the first and second periods.

Significant temporal peer comparisons are sent from Temporal Peer Comparison Service 116 for review. They can be sent to a network administrator or a service implementing further network changes based on the effects shown in the significant temporal peer comparisons. An example of such an output can be seen in FIG. 2.

Figure 2:
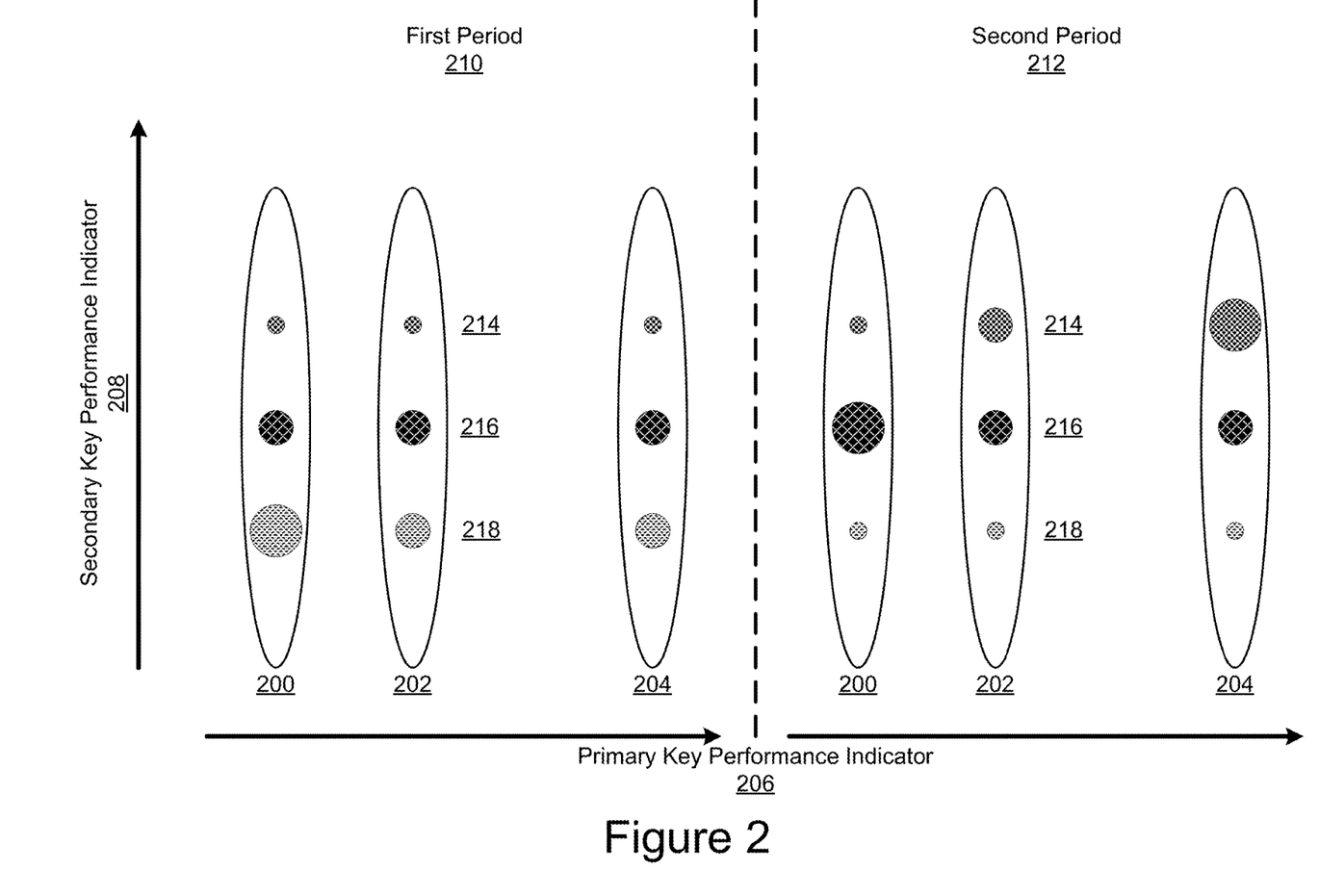
FIG. 2 illustrates an example output of devices and a network in accordance with some aspects of the present technology.

FIG. 2 illustrates an exemplary output of a significant temporal peer comparison from the system described in FIG. 1, in accordance with some aspects of the present technology.

The figure is a graphical illustration of changes from First Period 210 to Second Period 212. Specifically, the changes shown are changes in the distribution of Secondary Key Performance Indicator 208 within Primary Clusters 200, 202, and 204, which are clustered by Primary Key Performance Indicator 206. Within each of Primary Clusters 200, 202, and 204, there are Secondary Key Performance Indicator 208 clusters, such as Secondary Clusters 214, 216, and 218.

Primary Cluster 202 contains all entity data performing in a certain range on Primary Key Performance Indicator 206. Within Primary Cluster 202, entity data is clustered by Secondary Key Performance Indicator 208 into Secondary Clusters 214, 216 and 218. The size of each cluster corresponds to the quantity of entity data in that cluster.

Primary Cluster 202 is displayed twice: one display shows only First Period 210 data and the other shows only Second Period 212 data. The sizes of Secondary Clusters 214, 216, and 218 change from the first display to the second display, indicating a change in the distribution of Secondary Key Performance Indicator 208 within Primary Cluster 202 from First Period 210 to Second Period 212.

The contents of Primary Clusters 200 and 204 mirror the contents of Primary Cluster 202.

For example, suppose data comes from network access points, Primary Key Performance Indicator 206 is average throughput, and Secondary Key Performance Indicator 208 is average client received signal strength. All data, from First Period 210 and Second Period 212, is clustered by average throughput into Primary Clusters 200, 202, and 204. Then, within each of Primary Clusters 200, 202, and 204, the data is further clustered by average client received signal strength, resulting in, for Primary Cluster 202, Secondary Clusters 214, 216, and 218. Secondary Clusters 214, 216, and 218 can then be divided into First Period 210 and Second Period 212 data, resulting in the left-hand and right-hand visualizations, respectively. Within Primary Cluster 202, Secondary Cluster 214 is larger after the temporal event, Secondary Cluster 216 is the same size after the temporal event, and Secondary Cluster 218 is smaller after the temporal event. Taken as a whole, within Primary Cluster 202, average client received signal strength increased during Second Period 212 relative to First Period 210.

Figure 3:
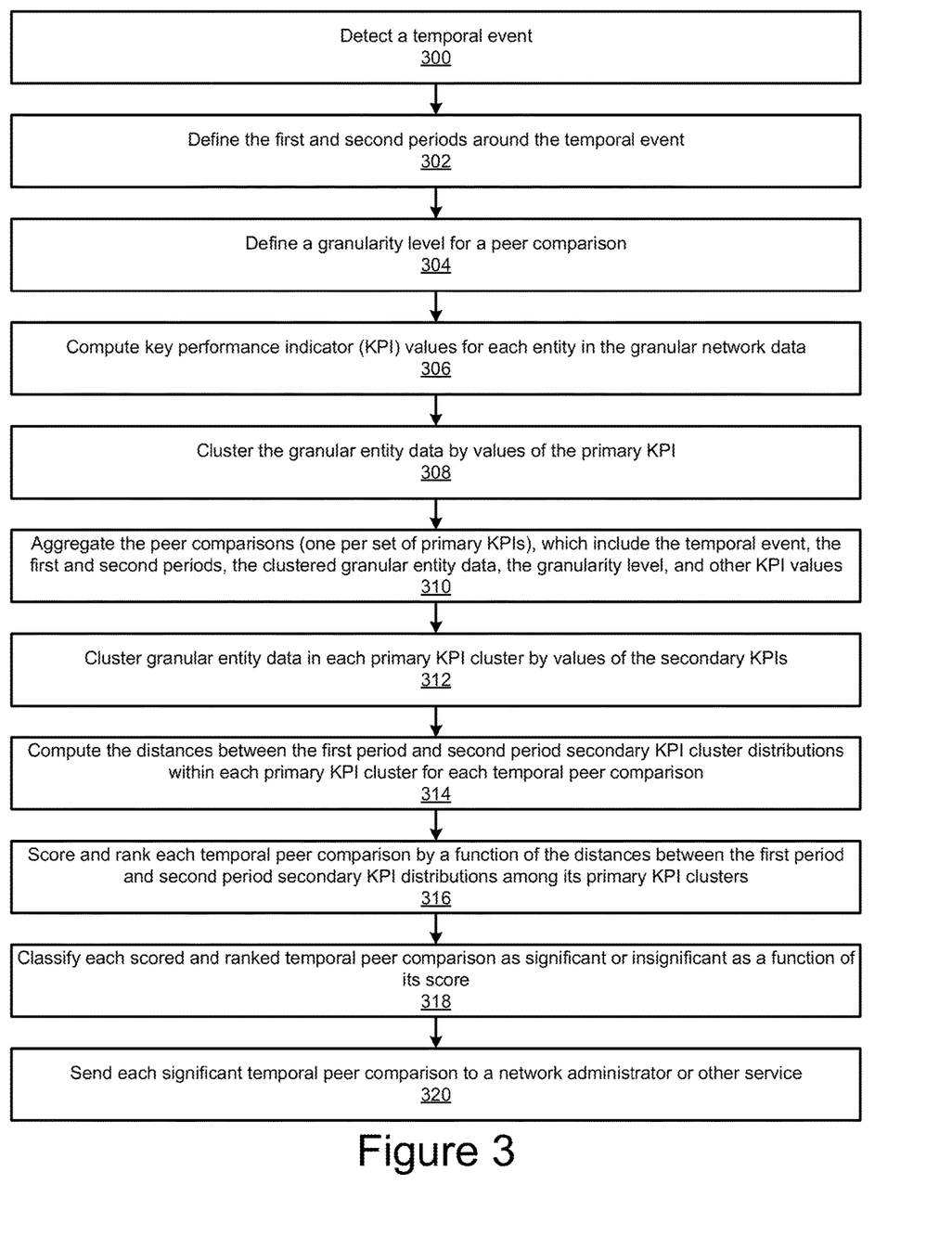
FIG. 3 illustrates an example method embodiment in accordance with some aspects of the present technology.

FIG. 3 illustrates an example method in accordance with some embodiments of the present technology, and can be carried out by the system described in FIG. 1. However, nothing in FIG. 3 should be considered limiting of the system illustrated in FIG. 1, and likewise, the system illustrated in FIG. 1 should not be interpreted to limit the method of FIG. 3. Any limitation of the depicted system or method will be recited in the appended claims.

The method begins when Temporal Event Detector 102 detects (300) a temporal event. In some embodiments, the temporal event can be detected automatically; in others, it can be manually submitted by a network administrator.

Data Delimiter 104 defines (302) first and second periods before and after the temporal event, respectively. In some embodiments, the first and second periods can be defined automatically, considering factors like desired sample size or nature of the temporal event; in others, a network administrator can manually define the duration of the first and second periods.

Granularity Definition Service 108 defines (304) a granularity level for peer comparisons. As Network 100 produces data of many different types, a granularity level selects a subset of network data affected or likely to be affected by the nature of the temporal event. In some embodiments, the granularity level can be automatically detected from network data and the nature of the temporal event; in others, it can be manually defined by a network administrator.

Key Performance Indicator Service 110 computes (306) key performance indicator values for each entity in the network data at the defined granularity level. In some embodiments, all possible key performance indicators will be computed, even if they are not used in the subsequent temporal peer comparisons. In some embodiments, the key performance indicators can be defined by a network administrator; in others, they can be learned from historical data or previous temporal peer comparison evaluations.

Data Clustering Service 112 clusters (308) the granular network data by each primary key performance indicator, with one peer comparison created for each chosen set of primary key performance indicators. A peer comparison can be clustered on one or more primary key performance indicators. In some embodiments, the primary key performance indicators can be defined by a network administrator; in others, they can be learned from historical data or previous temporal peer comparison evaluations.

At this point in the method, all data has been generated to create peer comparisons. Peer Comparison Aggregation Service 114 aggregates (310) the peer comparisons, each of which includes the temporal event, the first and second periods, granular network data clustered by at least one primary key performance indicator, the granularity level itself, and additional key performance indicator values for at least one secondary key performance indicator.

To create temporal peer comparisons, Delta-Key Performance Indicator Service 118 clusters (312), for each peer comparison, primary key performance indicator cluster data by at least one secondary key performance indicator. It then computes (314) the distances between first and second period secondary key performance indicator distributions within each primary key performance indicator cluster. Delta-Key Performance Indicator Service 118 can use the Kolmogorov-Smirnov distance, earth mover's distance, or another measure to calculate the distances between distributions.

Temporal Peer Comparison Scoring and Ranking Service 120 scores and ranks (316) each temporal peer comparison by a function of the between-distribution distances measured by Delta-Key Performance Indicator Service 118. In some embodiments, the scoring function can average the distances between secondary key performance indicator distributions for each primary key performance indicator cluster in a temporal peer comparison, or it can be a more complicated function of distance. The scored temporal peer comparisons are ranked, or ordered, according to their scores.

Temporal Peer Comparison Score Thresholding Service 122 classifies (318) each scored and ranked temporal peer comparison. These classifications are binary, either significant or insignificant. The classifications are based on the score assigned to the temporal peer comparisons by Temporal Peer Comparison Scoring and Ranking Service 120.

Temporal Peer Comparison Service 116 sends (320) each significant temporal peer comparison to a network administrator or other service. The significant temporal peer comparisons can be reviewed manually or automatically, depending on where they are sent. Review of the significant temporal peer comparisons can result in further network changes, depending on the results.

Figure 4:
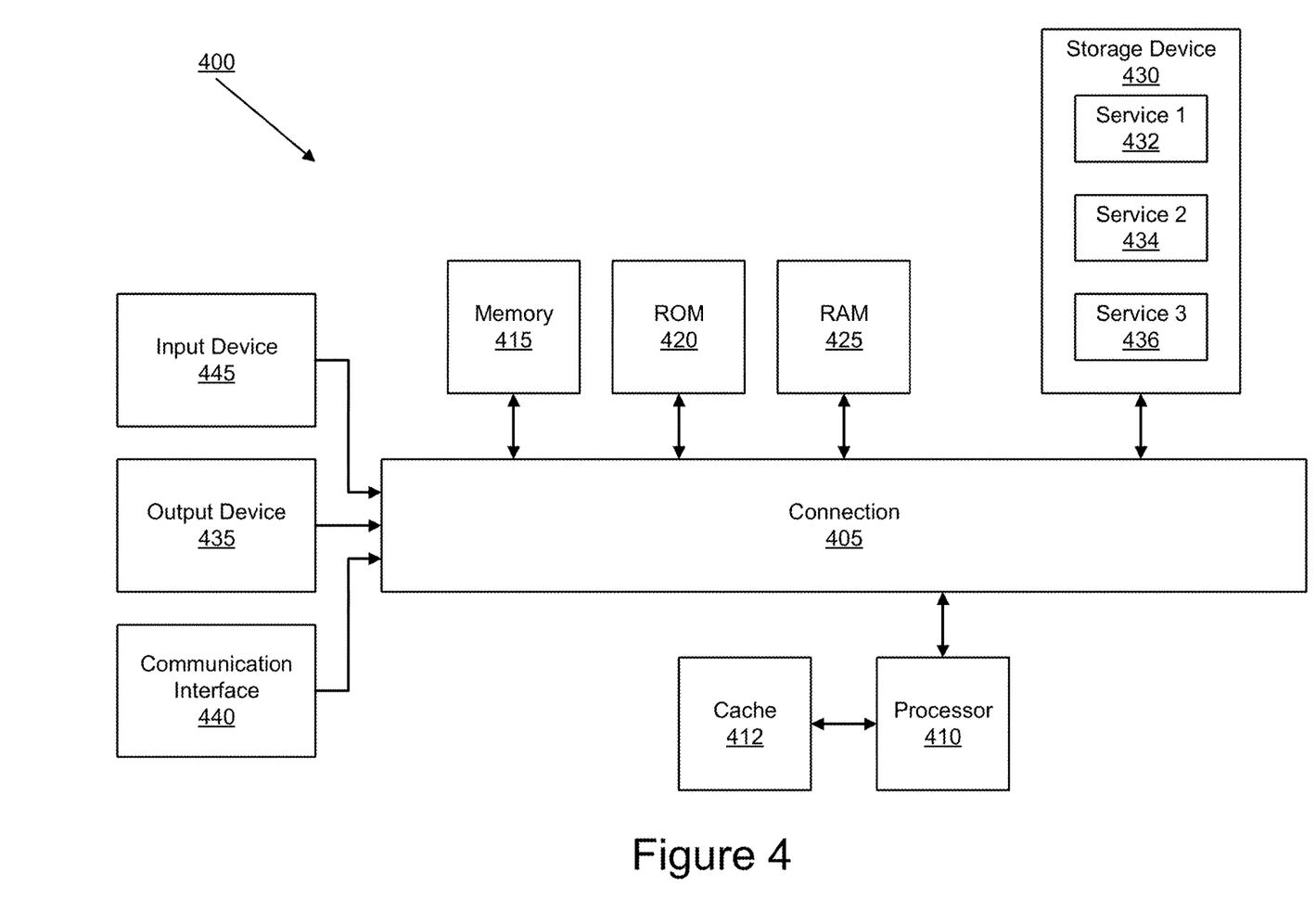
FIG. 4 illustrates an example system configuration in accordance with some aspects of the present technology.

FIG. 4 shows an example of computing system 400, which can be for example any computing device making up Temporal Event Detector 102, Data Delimiter 104, Peer Comparison Service 106, Temporal Peer Comparison Service 116, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments computing system 400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

The system, method, and non-transitory computer readable medium disclosed in the present technology solve a pressing need in the art. Networks regularly need to be optimized for a multitude of key performance indicators such that continually testing and altering the network is necessary to remain competitive in the industry. The present technology allows for detection of network change points and provides a systematic method for evaluating these changes and, when necessary, passing output data to a network administrator or other service for further review.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
    detecting a temporal event, wherein the temporal event is associated with a change in a network configuration, implementation, or utilization;
    defining a first period prior to the temporal event and a second period posterior to the temporal event, wherein a duration of one of the first period or the second period is determined based on a characteristic of the temporal event; and
    comparing network data collected in the first period and network data collected in the second period.

2. The method of claim 1, wherein the comparing the network data collected in the first period and the network data collected in the second period comprises:
    selecting at least one network entity as a focus of the comparing and at least one key performance indicator used to perform the comparing;
    separating, by the first period and the second period, data from the at least one network entity; and
    determining, from the first period to the second period, a change in the distribution of the at least one key performance indicator in the data from the at least one network entity.

3. The method of claim 2, wherein the at least one key performance indicator comprises at least two key performance indicators, comprising:
    clustering data from the at least one network entity during the first and second periods by at least one primary key performance indicator;
    separating, by the first period and the second period, data from the at least one network component within each primary key performance indicator cluster;
    determining, for each primary key performance indicator cluster, from the first period to the second period, a change in the distribution of at least one secondary key performance indicator in the data from the at least one network entity.

4. The method of claim 2, the method comprising:
    identifying at least one subset of the at least one network entities where the change in the distribution of data relative to at least one key performance indicator exceeds a threshold; and
    forwarding data and analysis of the at least one subset of the at least one network entities for review.

5. The method of claim 4, wherein the forwarding comprises displaying data and analysis on a graphical user interface.

6. The method of claim 1, wherein the temporal event is automatically detected.

7. The method of claim 1, wherein the first period and the second period are automatically defined.

8. A system comprising:
    a processor; and
    a computer-readable storage memory storing instructions which, when executed by the processor, cause the processor to perform operations comprising:
        detecting, via a temporal event detector, a temporal event in a network, wherein the temporal event is associated with a change in a network configuration, implementation, or utilization;
        defining, via a data delimiter, a first period prior to the temporal event and a second period posterior to the temporal event, wherein a duration of one of the first period or the second period is determined based on a characteristic of the temporal event; and
        comparing, via an evaluator, network data collected in the first period and network data collected in the second period.

9. The system of claim 8, wherein the evaluator is configured to:
    select at least one network entity as a focus of the comparing and at least one key performance indicator used to perform the comparing;
    separate, by the first period and the second period, data from the at least one network entity; and
    determine, from the first period to the second period, a change in the distribution of the at least one key performance indicator in the data from the at least one network entity.

10. The system of claim 9, wherein the at least one key performance indicator comprises at least two key performance indicators, wherein the evaluator is configured to:
    cluster data from the at least one network entity during the first and second periods by at least one primary key performance indicator;
    separate, by the first period and the second period, data from the at least one network component within each primary key performance indicator cluster,
    determine, for each primary key performance indicator cluster, from the first period to the second period, a change in the distribution of at least one secondary key performance indicator in the data from the at least one network entity.

11. The system of claim 9, wherein the evaluator is configured to:
    identify at least one subset of the at least one network entities where the change in the distribution of data relative to at least one key performance indicator exceeds a threshold; and
    forward data and analysis of the at least one subset of the at least one network entities for review.

12. The system of claim 11, wherein the computer-readable storage memory stores additional instructions which, when executed by the processor, cause the processor to perform operations further comprising:
    displaying, via a graphical user interface, data and analysis of the at least one subset of the at least one network entities for review.

13. The system of claim 8, wherein the temporal event detector is configured to automatically detect the temporal event.

14. The system of claim 8, wherein the data delimiter is configured to automatically define the first period and the second period.

15. A non-transitory computer readable medium comprising instructions that when executed cause at least one processor to:
   detect a temporal event, wherein the temporal event is associated with a change in a network configuration, implementation, or utilization;
   define a first period prior to the temporal event and a second period posterior to the temporal event, wherein a duration of one of the first period or the second period is determined based on a characteristic of the temporal event; and
   compare network data collected in the first period and network data collected in the second period.

16. The non-transitory computer readable medium of claim 15, comprising in instructions that:
   select at least one network entity as a focus of the comparing and at least one key performance indicator used to perform the comparing;
   separate, by the first period and the second period, data from the at least one network entity; and
   determine, from the first period to the second period, a change in the distribution of the at least one key performance indicator in the data from the at least one network entity.

17. The non-transitory computer readable medium of claim 16, wherein the at least one key performance indicator comprises at least two key performance indicators, comprising instructions that:
   cluster data from the at least one network entity during the first and second periods by at least one primary key performance indicator;
   separate, by the first period and the second period, data from the at least one network component within each primary key performance indicator cluster,
   determine, for each primary key performance indicator cluster, from the first period to the second period, a change in the distribution of at least one secondary key performance indicator in the data from the at least one network entity.

18. The non-transitory computer readable medium of claim 16, comprising instructions that:
   identify at least one subset of the at least one network entities where the change in the distribution of data relative to at least one key performance indicator exceeds a threshold; and
   forward data and analysis of the at least one subset of the at least one network entities for review.

19. The non-transitory computer readable medium of claim 15, wherein the temporal event is automatically detected.

20. The non-transitory computer readable medium of claim 15, wherein the first period and the second period are automatically defined.

\* \* \* \* \*